US010909169B2

(12) United States Patent
Hayakawa

(10) Patent No.: US 10,909,169 B2
(45) Date of Patent: Feb. 2, 2021

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 15/227,641

(22) Filed: Aug. 3, 2016

(65) Prior Publication Data
US 2017/0039223 A1 Feb. 9, 2017

(30) Foreign Application Priority Data
Aug. 7, 2015 (JP) .................................. 2015-157650

(51) Int. Cl.
*G06F 16/583* (2019.01)
*G06F 16/51* (2019.01)
*G06F 16/28* (2019.01)
*G06F 16/58* (2019.01)

(52) U.S. Cl.
CPC .......... *G06F 16/583* (2019.01); *G06F 16/285* (2019.01); *G06F 16/51* (2019.01); *G06F 16/58* (2019.01)

(58) Field of Classification Search
USPC ...................................................... 707/737
See application file for complete search history.

(56) References Cited

U.S. PATENT DOCUMENTS

| 5,692,173 A * | 11/1997 | Chew ..................... G06F 17/30 707/E17.104 |
| 7,409,405 B1 * | 8/2008 | Masinter ................. G06F 9/445 |
| 2005/0190394 A1 * | 9/2005 | Ohue ................. H04N 1/00204 358/1.13 |
| 2007/0051793 A1 * | 3/2007 | Katoh et al. ............ G06F 17/00 386/E9.036 |
| 2007/0146504 A1 * | 6/2007 | Morimoto ............ G11B 27/034 348/231.3 |
| 2007/0242138 A1 * | 10/2007 | Manico et al. ......... G06F 16/58 707/E17.026 |

(Continued)

FOREIGN PATENT DOCUMENTS

| JP | 2003-242004 A | 8/2003 |
| JP | 2005-18549 A | 1/2005 |

(Continued)

*Primary Examiner* — Muluemebet Gurmu
(74) *Attorney, Agent, or Firm* — Canon U.S.A., Inc. IP Division

(57) ABSTRACT

An information processing apparatus includes a first acquiring unit configured to acquire file management information regarding one or more image files contained in a folder, a sorting unit configured to sort the file management information acquired by the first acquiring unit, a second acquiring unit configured to access image files corresponding to a first piece of the file management information and a last piece of the file management information among the pieces of file management information sorted by the sorting unit and acquire meta information regarding the two image files, and an identifying unit configured to identify a range of capture dates of the image files contained in the folder based on the meta information acquired by the second acquiring unit.

16 Claims, 8 Drawing Sheets

(56) References Cited

U.S. PATENT DOCUMENTS

2008/0016470 A1\* 1/2008 Misawa et al. ......... G06F 16/58
715/839
2015/0161491 A1\* 6/2015 Yamada ............. G06K 15/1885
358/1.6

FOREIGN PATENT DOCUMENTS

| JP | 2005-286682 A | 10/2005 |
| JP | 2014-059773 A | 4/2014 |

\* cited by examiner

INFORMATION PROCESSING APPARATUS, INFORMATION PROCESSING METHOD, AND PROGRAM

BACKGROUND OF THE INVENTION

Field of the Invention

The present invention relates to an information processing apparatus, an information processing method, and a program for identifying the dates and times of capture of images in a folder.

Description of the Related Art

To create a photo album, a method for analyzing images in a folder specified by a user, automatically selecting images, and automatically placing the selected images in the photo album has been developed. At that time, the user needs to select the folder that stores the image files. To allow the user to easily select a folder, a method for calculating the range of capture dates of the images using the earliest image file and the latest image file in the folder and changing the representation of thumbnail images or the volume of the background music (BGM) in accordance with the range of capture dates has been developed (refer to Japanese Patent Laid-Open No. 2005-18549). In Japanese Patent Laid-Open No. 2005-18549, the time stamps of all the image files in a folder are acquired and, thereafter, the image file having the earliest time stamp and the image file having the latest time stamp are obtained.

At that time, two types of time stamp are recorded—one for the creation date and time and the other for the modification date and time. When a picture is taken, the date and time the picture was taken is the same as the creation date and time. However, if the picture file is copied, the time stamp of the copied file is replaced with the date and time the file is copied. In addition, if the picture is edited, the modification date and time is replaced with the date and time the picture was edited. Accordingly, if the time stamp is used as the date and time of capture of the image, the date and time is displayed on the basis of the date and time that differ from the original date and time of capture of the picture. If the modification date and time is used, the issue caused by copying can be addressed for the files not modified by the copying. However, if, thereafter, the file is subjected to an edit process, such as rotation, cropping, or image processing, the modification date and time is changed. Accordingly, it is difficult to obtain, from the time stamp, the accurate date and time of capture of the picture.

SUMMARY OF THE INVENTION

The present invention provides an information processing apparatus including a first acquiring unit configured to acquire file management information regarding one or more image files contained in a folder, a sorting unit configured to sort the file management information acquired by the first acquiring unit, a second acquiring unit configured to access image files corresponding to a first piece of the file management information and a last piece of the file management information among the pieces of file management information sorted by the sorting unit and acquire meta information regarding the two image files, and an identifying unit configured to identify a range of capture dates of the image files contained in the folder based on the meta information acquired by the second acquiring unit.

Further features of the present invention will become apparent from the following description of exemplary embodiments with reference to the attached drawings.

DESCRIPTION OF THE EMBODIMENTS

Figure 1:
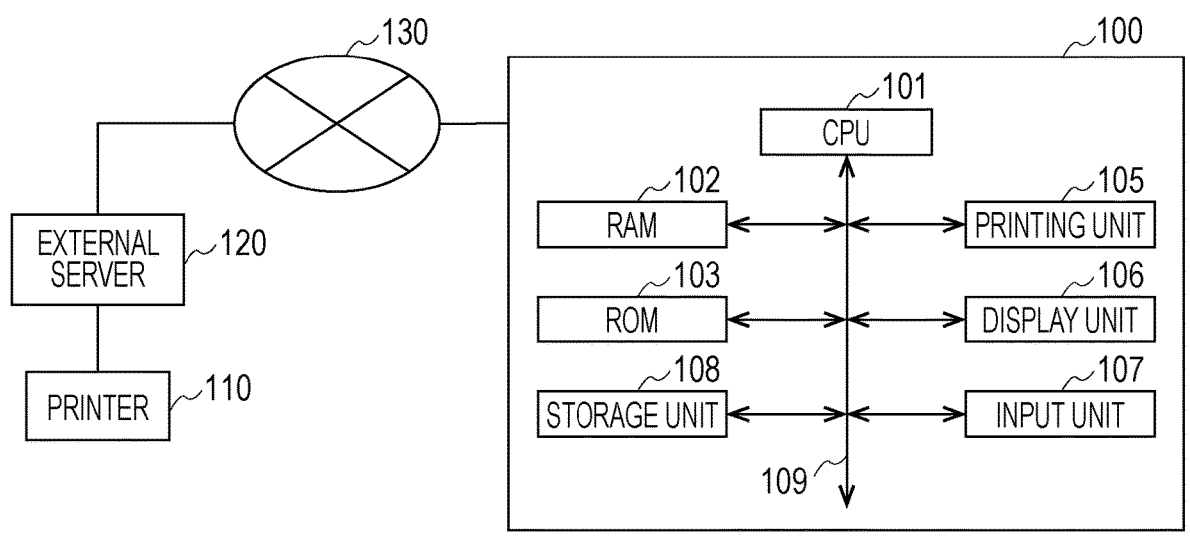
FIG. 1 is a configuration diagram of an information processing system according to a first exemplary embodiment.

Exemplary embodiments of the present invention are described in detail below with reference to the accompanying drawings. Note that the following description of exemplary embodiments is merely illustrative in nature and is in no way intended to limit the invention, its application, or uses. All of the features and the combinations thereof described in the embodiment are not necessarily essential to the invention.

First Exemplary Embodiment

An information processing system according to the first exemplary embodiment is described in detail below with reference to FIG. 1. The information processing system includes an external server 120 and an information processing apparatus 100. The external server 120 and the information processing apparatus 100 are connected to each other via a network 130.

The information processing apparatus 100 is capable of generating the image data of an album (a photo album or a photo book) from input image data. In addition, the information processing apparatus 100 is capable of printing (outputting) the image data generated for an album and uploading the image data onto the external server 120 via the network 130. The information processing apparatus 100 includes a central processing unit (CPU) 101, a read only memory (ROM) 103, a random access memory (RAM) 102, a printing unit 105, a display unit 106, an input unit 107, and a storage unit 108, all of which are connected to one another via a system bus 109. The information processing apparatus 100 further includes an input and output interface (not illustrated) that connects the information processing apparatus 100 to the network 130.

The CPU 101 executes an operating system program (hereinafter simply referred to as an "OS") stored in, for example, the storage unit 108, the ROM 103, or the RAM 102 and performs overall control of the information processing apparatus 100. In addition, the CPU 101 executes programs stored in the ROM 103 and the RAM 102 and provides the function configuration of the information processing apparatus 100 and performs arithmetic operations and processing on information. The ROM 103 stores a variety of programs. The RAM 102 is used as a work memory of the CPU 101 and the temporary storage area that stores a variety of data.

The printing unit 105 prints an image on the basis of the print data generated by the information processing apparatus 100. The printing based on the image data generated by the information processing apparatus 100 for an album may be performed by a printer 110 or the printing unit 105 of the information processing apparatus 100. When the printing unit 105 is used for printing, the user can bind a book to achieve an album.

The display unit 106 serves as a display unit that displays the image information output from the information processing apparatus 100. The input unit 107 is used by the user to input information to the information processing apparatus 100. For example, a keyboard or a pointing device can be used as the input unit 107. Note that according to the present exemplary embodiment, the display unit 106 is separated from the input unit 107. However, like a touch screen panel, the display unit 106 and the input unit 107 may be integrated into one body. The storage unit 108 is a storage unit that stores, for example, the image data and templates. For example, a hard disk drive (HDD) or a solid state drive (SSD) can be used as the storage unit 108. According to the present exemplary embodiment, the storage unit 108 stores an application program that creates a photo album. Creation of a photo album is described in more detail below.

In FIG. 1, the information processing apparatus 100 includes the display unit 106, the input unit 107, and the storage unit 108. However, the configuration is not limited thereto. For example, the information processing apparatus 100 need not include all of the display unit 106, the input unit 107, and the storage unit 108. Each of the display unit 106, the input unit 107, and the storage unit 108 may be an external apparatus connected to the information processing apparatus 100.

The network 130 is connected to each of the information processing apparatus 100 and the external server 120 and serves as a communication network that communicates information between the information processing apparatus 100 and the external server 120 connected thereto.

The external server 120 includes an input and output interface (not illustrated) that connects the external server 120 to the printer 110. Thus, the external server 120 is connected to the printer 110 via the input and output interface.

According to the present exemplary embodiment, the external server 120 serves as an album order receipt and management server. The user uploads the image data generated using the information processing apparatus 100 to create a photo album. If the external server 120 determines that the conditions that start printing is satisfied, the external server 120 outputs printout using the printer 110 on the basis of the image data uploaded for creating the photo album. Note that if the user has completed their purchase of the album, the external server 120 determines that a condition to start printing is satisfied. Thereafter, the printouts that are output are bound into a book and are delivered to the user.

A file system managed by the OS of the information processing apparatus 100 is described below. Image files are stored in a secure digital (SD) card using a file system, such as File Allocation Table (FAT), FAT32, or exFAT. In addition, the image files are stored in a local file using, for example, the NT File System (NTFS), the second extended file system (ext2), or a fourth extended file system (ext4). Each of the file systems has its own file management information. To ensure compatibility with other file systems, a large number of file systems manage the file management information, such as a file name and a time stamp, in such a manner that the file management information is common to other file systems. To allow high-speed acquisition and updating of the file management information before accessing a file, the file management information is recorded in a table stored at a location that differs from the location of the file itself. The time stamp is updated by the OS through file manipulation on the OS (e.g., copying, moving, and editing the image).

In addition, an image file includes the date and time the picture (the image) was taken in a format defined by Exchangeable Image file format defined by Japan Electronics and Information Technology Industries Association (JEIDA) (hereinafter, the date and time in this format is referred to as "Exif capture date and time"). The Exif capture date and time is stored inside the image file. Accordingly, even when the file is copied or moved, the Exif capture date and time inside the file is not changed and remains unchanged. However, to obtain the Exif capture date and time, access to the inside of the file is needed. Thus, it takes more time to obtain the Exif capture date and time than to obtain the file management information, such as the file name and the time stamp, managed by the file management system. For example, the time required for obtaining the names or the time stamps of files in the folder does not depend on the number of images in the folder and is almost constant. Thus, the file names or the time stamps can be obtained at high speed. In contrast, the time required for obtaining the Exif capture dates and times of the images in the folder is proportional to the number of images in the folder.

The file saving format for digital cameras used in the present exemplary embodiment is described next. The images captured by a digital camera are stored in an external storage, such as an SD® card or a compact Flash®. Note that the name of the folder that stores the images and the name of the image file follow the file naming convention defined by Camera & Imaging Products Association (CIPA). Most of the digital cameras follow the file naming convention. More specifically, the naming convention is defined by CIPA DC-009-2010. The file name is 8 characters in length. Any character string can be used for the first four characters by a manufacturer. For example, "IMG_" or "_IM_" can be used. The first four characters is allowed to change for each image capturing operation. However, to ensure the usability when the user organizes and manages the image files, many digital cameras employ the same character string. In addition, the last four characters should be a character string indicating a number between "0001" to "9999". The numbers need not be serial numbers. However, to ensure the usability when the user organizes and manages the image files, many digital cameras employ the serial numbers unless an image file having a serial number in this range is deleted.

Figure 2:
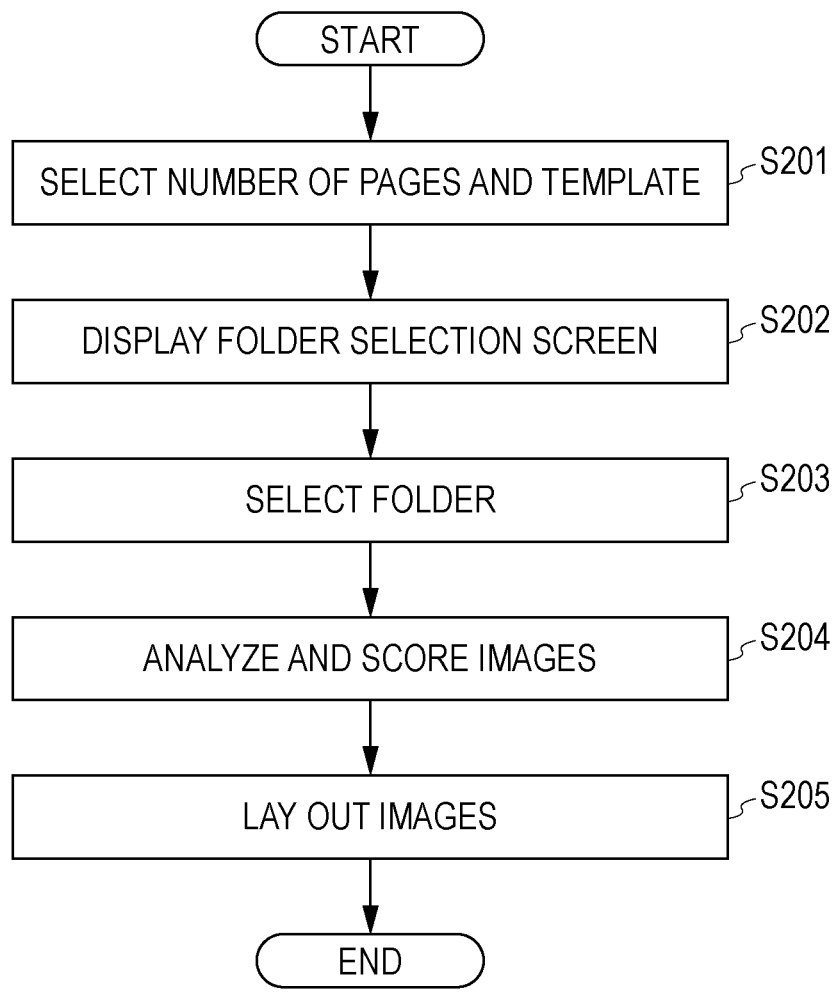
FIG. 2 is a flowchart of photo album creation according to the first exemplary embodiment.

The flowchart of the process performed by an application that creates a photo album in the information processing apparatus 100 is described next with reference to FIG. 2. According to the present exemplary embodiment, the album creation application stored in the storage unit 108 is started when the user, for example, double-clicks the icon of the application displayed on the display unit 106. More specifically, the program of the album creation application stored in the storage unit 108 is loaded into the RAM 102 and is executed by the CPU 101. Thus, the album creation application starts.

If, in step S201, the display screen for album creation is displayed on the display unit 106 after the application starts, the user specifies the number of pages and the template through the input unit 107. In this manner, the number of pages and the template can be selected. As used herein, the term "template" refers to a template that determines the layout of the images used when a photo album is created. As described above, the display screen for album creation is displayed on the display unit 106 under the control of the album creation application.

Figure 3:
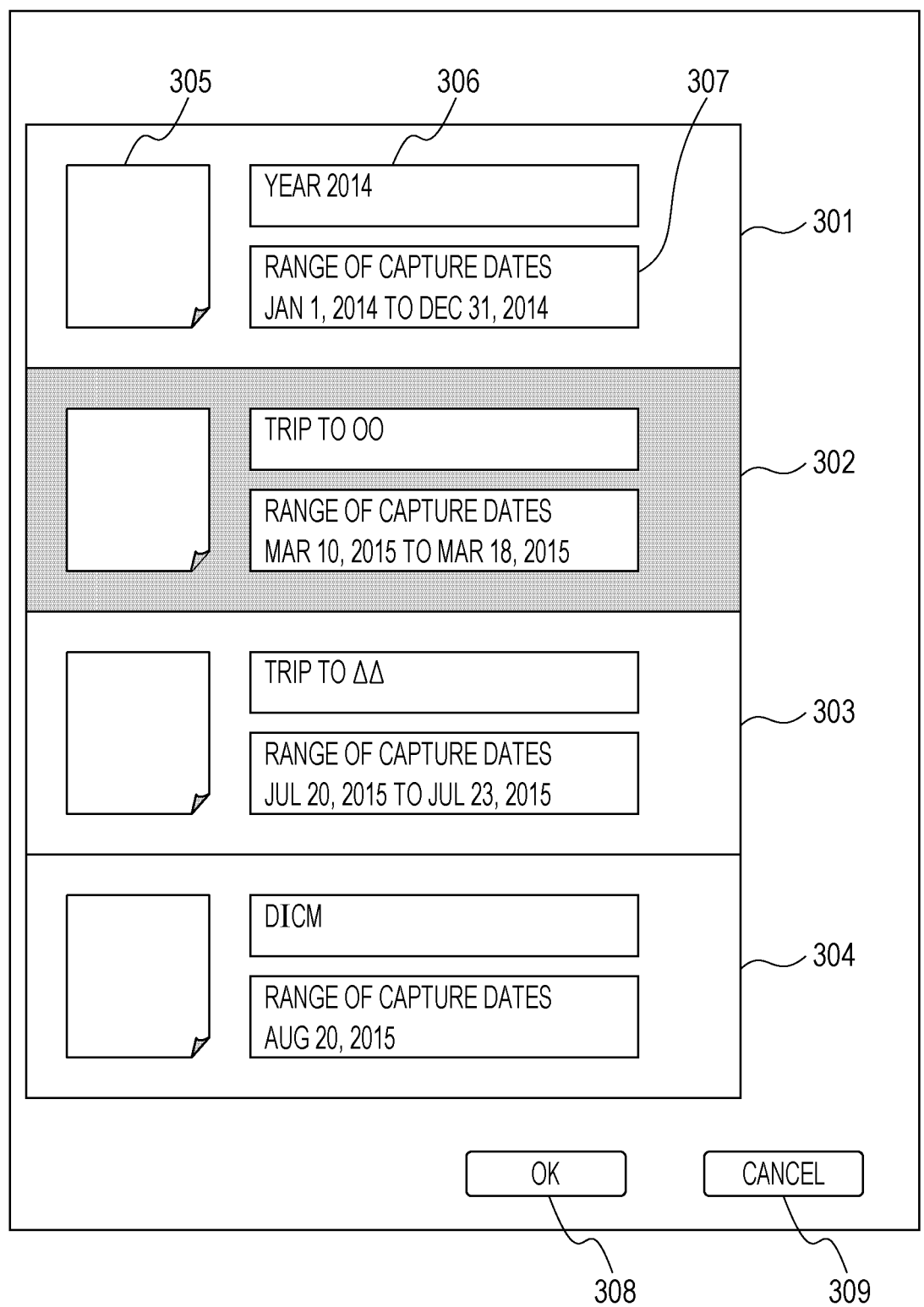
FIG. 3 illustrates a folder selection screen according to the first exemplary embodiment.

In step S202, the application displays a folder selection screen on the display unit 106. At that time, the range of capture dates of the image files contained in the folder is displayed in the selection screen. FIG. 3 illustrates an example of the folder selection screen displayed on the display unit 106. As illustrated in FIG. 3, the image file information regarding each of the folders is displayed in the form of a list. Each of the folder list entries (301 to 304) displays, as the image file information, a representative image 305 among the images contained in the folder, the folder name 306, and the range of capture dates 307. The first image in the folder may be selected as the representative image 305. Alternatively, the image that was most frequently accessed may be selected as the representative image 305. In addition, the range of capture dates 307 represents the range of capture dates of the images (pictures) contained in the folder. Furthermore, the selection screen includes an OK button 308 and a cancel button 309. In FIG. 3, four list entries (301 to 304) are displayed, and the second list entry 302 is being selected. If the OK button 308 is depressed, the folder selection is finally made. If the cancel button 309 is depressed, the selection screen is closed.

As illustrated in FIG. 3, if the range of capture dates 307 is displayed, the user can easily select one of the folders using the dates the pictures were taken by the user. If the folder name indicates the image scene of the images, selection can be made on the basis of the folder name. However, if, as in the folder list entry 304, the folder name of a folder simply copied from an SD card is used, it is difficult for the user to select a desired folder. In contrast, according to the present exemplary embodiment, since the range of capture dates of the pictures contained in a folder is displayed, the user can easily select a desired folder.

The process to identify the range of capture dates of the images contained in the folder is described below with reference to FIG. 4.

In step S401, the application acquires the list of files from a folder stored in the storage unit 108.

In step S402, the application sorts the file names in the file list. In the sort of the file names, alphabetic characters are sorted in the order from a to z, and the numbers are sorted in ascending order. Note that the determination is sequentially made from the first characters of the file names. As described above, the naming convention of the file name is defined by CIPADC-009-2010 so that the file name is 8 characters in length. The first four characters can be any character string determined by a manufacturer. The last four characters should be a number character in the range from "0001" to "9999". Accordingly, in terms of the products of the same manufacturer, the first four characters are the same in general and, thus, sorting is performed using the last four characters. According to the present exemplary embodiment, it is highly likely that the image file corresponding to the first file name is the earliest, and the image file corresponding to the last file name is the latest. Note that according to the present exemplary embodiment, the numbers are sorted in ascending order. However, the numbers may be sorted in descending order. In such a case, it is highly likely that the image file corresponding to the first file name is the latest, and the image file corresponding to the last file name is the earliest. In step S403, the application compares the first four characters (also referred to as a "prefix") of the file name of the first image file in the sorted list with the first four characters of the file name of the last image file in the sorted list and determines whether the four-character strings are the same. If the four-character strings are the same, the processing proceeds to step S404. However, if the four-character strings are not the same, the processing proceeds to step S405. Note that while the first four characters are compared in step S403, the length of the characters is not limited to four.

In step S404, the application accesses the file corresponding to the first file name in the list and the file corresponding to the last file name in the list and loads the Exif capture date and time from each of the files. Thereafter, the application calculates the range of capture dates on the basis of the loaded Exif capture dates and times. Subsequently, the processing is completed. In this manner, the range of capture dates of the pictures in a target folder is identified.

In step S405, the application determines whether the number of files contained in the folder is greater than or equal to a threshold value. If the number of files contained in the folder is less than the threshold value, the processing proceeds to step S406. However, if the number of files contained in the folder is greater than or equal to the threshold value, the processing proceeds to step S407. Note that the threshold value can be set to any suitable value for switching processing. According to the present exemplary embodiment, the threshold value is set to, for example, 10.

In step S406, the application accesses all the files and loads the Exif capture date and time of each of the files. Thereafter, the application identifies the earliest capture date and time and the latest capture date and time from the loaded Exif capture dates and times and calculates the range of capture dates of the pictures on the basis of the earliest and latest dates and times. Thereafter, the processing is completed. In this manner, the range of capture dates of the pictures in a target folder is identified.

In step S407, the application acquires the date information from the time stamps of all the files and identifies the earliest date and the latest date from the acquired time stamps. Thereafter, the application calculates the range of capture dates and completes the processing. Note that two types of time stamp are recorded, that is, the creation date and the modification date. The application can acquire the two types of time stamps. According to the present exemplary embodiment, the date and time the picture was taken is defined as the earlier one of the creation date and time and the modification date and time. In this manner, the application identifies the range of capture dates of the target folder. The application performs the processes from step S401 to step S407 described above for each of the folders. Thus, the range of capture dates calculated for each of the folders through the processing flow illustrated in FIG. 4 is displayed in the folder selection screen displayed in step S202.

Referring back to the description of step S203, if the user selects one of the folders in the list displayed in the selection screen and depresses the OK button 308, the folder selection is validated (determined). Note that if the cancel button 309 is selected, the process illustrated in FIG. 2 is completed.

In step S204, the application acquires an image file from the folder selected by the user. Thereafter, the application analyzes the image and scores the image.

In step S205, the application lays out the images in the template selected in step S201 on the basis of the result of the scoring operation performed in step S204. In this manner, the application generates a layout image.

If, in step S201, a plurality of pages are selected as the number of pages, the processing returns to step S202 after the process in step S205 is completed. Thereafter, the steps S202 to S204 are repeated until the layout images for all the pages are generated. Note that after the layout images for all the pages have been generated, the processing is completed. According to the present exemplary embodiment, the image files are sorted by name, and the dates and times of capture of the images in the folder are identified using the Exif picture information regarding the files corresponding to the first file name and the last file name in the sorted file name list. In general, a picture file recorded by a digital camera has a file name that follows the standard defined by CIPA. If picture files are recorded using such a standardized file name, the names of the picture files have the same prefix and sequential numbers. Accordingly, if the picture files are sorted by file name, the picture files are arranged in the order of the dates they were taken. The first file name indicates the file having the earliest date the picture was taken, and the last file name indicates the file having the latest date the picture was taken. Thus, the two files are read in, and the Exif capture dates and times are acquired. The dates are the same as the dates the pictures in the folder were taken. As a result, according to the present exemplary embodiment, the dates and times of capture of the images in the folder can be identified at a speed higher than that when the Exif capture dates and times of all the images in the folder are acquired.

In addition, according to the present exemplary embodiment, since the Exif picture information regarding the image files having the first and last file names in the sorted file list are acquired, the range of capture dates for the folder selected by the user can be identified even when the number of images that exceeds the allowable number of images to be analyzed are contained in the folder.

Note that the file names that follow the file naming convention defined by CIPA can remain unchanged even when the users copy the files into a storage unit, such as a local HDD, without changing the file names. Accordingly, an image data file acquired from a storage (e.g., an SD® card or a CompactFlash®) that directly stores images captured by a digital camera and the image data file stored in a local HDD have the same file name. Accordingly, the range of capture dates for a folder can be calculated at high speed for the image data files acquired from either storing destination.

In addition, two types of time stamp (i.e., the creation date and time and the modification date and time) are recorded. If an image file is copied, the creation date and time is changed. If an image file is edited, the modification date and time is changed. In contrast, the Exif capture date and time employed in the present exemplary embodiment is not changed and remains unchanged inside the file even when the file is copied or moved. Thus, according to the present exemplary embodiment, the range of capture dates of the images in a folder can be accurately identified.

Furthermore, according to the present exemplary embodiment, if the prefixes of image files are not the same, determination using the threshold value is made in step S405. If the number of the image files is less than the threshold value, the Exif capture dates and times are acquired, and the range of capture dates for the folder is identified. As described above, if the number of the files is less than the threshold value and, thus, any problem does not arise (e.g., the user does not wait for a long time until the processing is completed) even when the Exif capture dates and times of all the files are loaded, the Exif capture dates and times are used to increase the accuracy of the date. In this manner, the range of capture dates can be accurately identified while reducing the time required for identifying the range of capture dates.

However, according to the present exemplary embodiment, when the number of files is greater than or equal to a predetermined value and if the Exif capture dates and times of all the files are loaded, a large amount of time is required. In such a case, the time stamps that can be loaded at high speed is used, although the accuracy of the date may be decreased.

Still furthermore, according to the present exemplary embodiment, an accurate range of capture dates can be displayed to the user when the user selects a folder. Thus, in the selection process that allows the user to select a folder in, for example, photo album creation, the user can easily select the folder containing the pictures for the photo album on the basis of the dates and times the pictures were taken.

Figure 4:
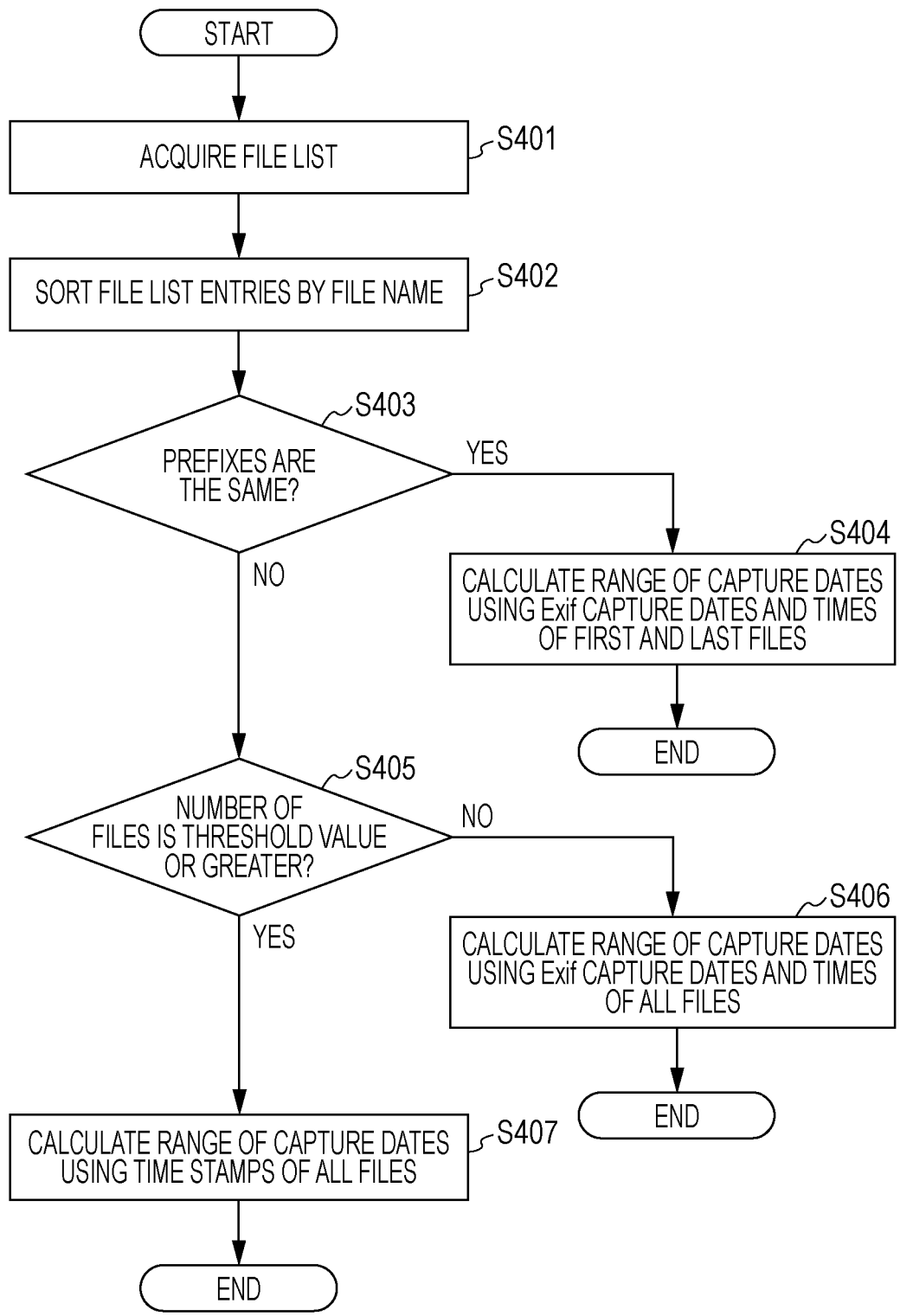
FIG. 4 is a flowchart of a process to identify the range of capture dates of the images contained in a folder according to the first exemplary embodiment.

Note that in the flow illustrated in FIG. 4, if the prefixes are not the same (No in step S403) or if the number of the files is greater than or equal to the threshold value (Yes in step S405), it may be determined that an error has occurred and the processing may be completed. In such a case, the processing may return to step S203 with an indication that the range of capture dates has not been acquired. At that time, an error message indicating that the range of capture dates for the folder cannot be acquired may be given to the user.

Second Exemplary Embodiment

A method for accurately identifying the range of capture dates for the folder that contains image files captured by a plurality of digital cameras according to the present exemplary embodiment is described below.

Even when digital cameras store image files using the file naming convention defined by CIPA, the prefixes of the files may differ from one another if the user stores all the files in a folder of, for example, a local HDD. For example, this situation may occur if the manufacturers of the cameras differ from one another or if the types of cameras of the same manufacturer differ from one another. In such a case, according to the first exemplary embodiment, it is determined that the prefixes are not the same in step S403. Note that the case that a single folder having images captured by a plurality of cameras stored therein occurs if, for example, a plurality of persons take pictures during a trip or a wedding ceremony and save the pictures in the same folder. According to the present exemplary embodiment, even in such a case, the range of capture dates can be accurately identified at high speed.

In the following description of the present exemplary embodiment, description that is the same as in the first exemplary embodiment is not repeated.

A process to identify the range of capture dates of the images contained in a folder according to the present exemplary embodiment is described next with reference to a flowchart illustrated in FIG. 5.

Since the processes in steps S501 to S504 are the same as those in steps S401 to S404 of the first exemplary embodiment, respectively, descriptions of steps S501 to S504 are not repeated.

Figure 6:
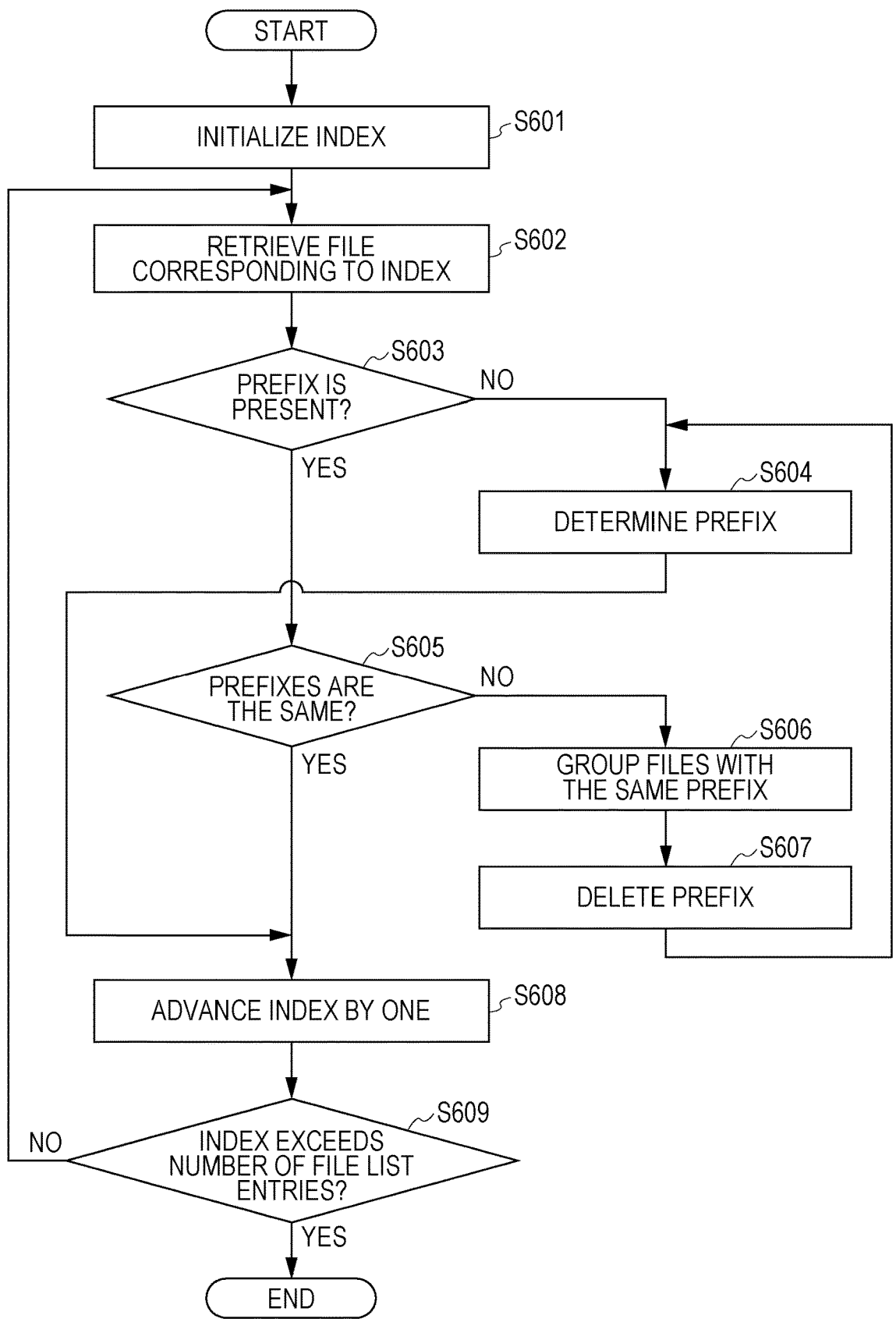
FIG. 6 is a flowchart of a process to group file list entries according to the second exemplary embodiment.

In step S505, the application uses a sorted file list and classifies files into groups using the prefixes. The grouping process performed in step S505 is described below with reference to a flowchart illustrated in FIG. 6.

In step S601, the application initializes an index used to scan the file list. Note that by incrementing the index, the application sequentially scans the file list entries.

In step S602, the application acquires the file name corresponding to the index of interest.

In step S603, the application determines whether the prefix has already been in the memory, that is, the prefix has already been determined. If the prefix has already been in the memory (Yes in step S603), the processing proceeds to step S605. However, if the prefix has not yet been in the memory (No in step S603), the processing proceeds to step S604. Note that the prefix is determined in step S604 (described below). Accordingly, if the process in the step S603 is performed for the first time, the processing proceeds to step S604 since the prefix has not been determined.

In step S604, the application determines the prefix for the target folder using the file name corresponding to the index of interest. For example, the first four characters of the file name may be selected as the prefix. Alternatively, the leading non-numeric character string in the file name may be selected as the prefix. After the prefix is determined, the prefix is stored in the memory for the target folder. Thereafter, the processing proceeds to step S608.

In step S605, the application determines whether the prefix of the file name corresponding to the index of interest and retrieved in step S602 is the same as the prefix stored in the memory (i.e., the prefix determined in step S604 for the previous index). If the two prefixes are the same (Yes in step S605), the processing proceeds to step S608. However, if the two prefixes are not the same (No in step S605), the processing proceeds to step S606.

In step S606, the files having the same prefix are separated (grouped). Note that the files up to the file corresponding to the immediately previous index have the same prefix. Accordingly, the files up to the file corresponding to the immediately previous index are grouped. In addition, the information identifying the separator position is stored. For example, the index indicating the separator position may be stored in the memory. Alternatively, the file names up to the separator position in the file list may be copied.

In step S607, the application deletes the prefix for the target folder determined in step S604. After the prefix is deleted, the processing proceeds to step S604 to determine the next prefix for the target folder.

In step S608, the application advances the index, that is, increments the index.

In step S609, the application determines whether the index exceeds the number of files in the file list. If the index does not exceed the number of files in the file list (No in step S609), a file to be scanned still remains. Thus, the processing proceeds to step S602. However, if the index exceeds the number of the files in the file list (Yes in step S609), the index has reached the end of the list. Accordingly, the processing is completed.

By repeating the above-described processes, the file list is scanned, and grouping the files with the same prefix can be made in the file list.

In step S506, the application determines whether the number of groups obtained through the grouping made in step S505 is greater than or equal to a threshold value. In this example, the threshold value is set to 4. If the number of groups is less than the threshold value (No in step S506), the processing proceeds to step S507. However, the number of groups is greater than or equal to the threshold value (Yes in step S506), the processing proceeds to step S508.

In step S507, the application acquires the Exif capture dates and times from the files corresponding to the first and last file names in the file name list of each group. Thereafter, the application searches for the earliest date and the latest date from all the Exif capture dates and times that have been acquired and calculates the range of capture dates. In this manner, the application identifies the range of capture dates for the target folder.

In step S508, the application acquires the date information from the time stamps. Thereafter, the application acquires the earliest date and time of capture and the latest date and time of capture from among the acquired dates and times of capture and calculates the range of capture dates using the earliest date and time and the latest date and time. Note that two types of time stamp (i.e., the creation date and time and the modification date and time) are recorded and the application can acquire both types of time stamps. According to the present exemplary embodiment, the application selects the earlier one of the creation date and time and the modification date and time as the date and time of capture. In this manner, the application identifies the range of capture dates for the target folder.

According to the present exemplary embodiment, the dates and times of capture of the images in the folder can be identified at a speed higher than that when the Exif capture dates and times of all the images in the folder are acquired. In addition, according to the present exemplary embodiment, even when the image files having different prefixes are contained in the folder, the range of capture dates can be accurately identified at high speed. For example, when the image files captured by a plurality of digital cameras are stored in a single folder, the range of capture dates of the images contained in the folder can be accurately calculated at high speed. More specifically, according to the present exemplary embodiment, even when a folder contains the images captured by a plurality of cameras, only the Exif capture dates and times equal in number to the number of cameras×2 can be loaded. Accordingly, the range of capture dates of the images contained in the folder can be accurately calculated at high speed.

Furthermore, according to the present exemplary embodiment, the application acquires the Exif picture information regarding the image files corresponding to the first file name and the last file name in a file name list sorted for each of the groups. Accordingly, even when the folder selected by the user contains a number of images that exceeds the allowable number for analysis, the range of capture dates for the folder can be identified.

If the number of the acquired Exif capture dates and times increases, it is difficult to complete the process for identifying the range of capture dates within a predetermined period of time. In contrast, according to the present exemplary embodiment, if the number of groups in the list is greater than or equal to a threshold value, the range of capture dates for the folder is identified using the time stamps instead of using the Exif capture dates and times. In this manner, the range of capture dates can be accurately identified while reducing the time required for identifying the range of capture dates.

Figure 5:
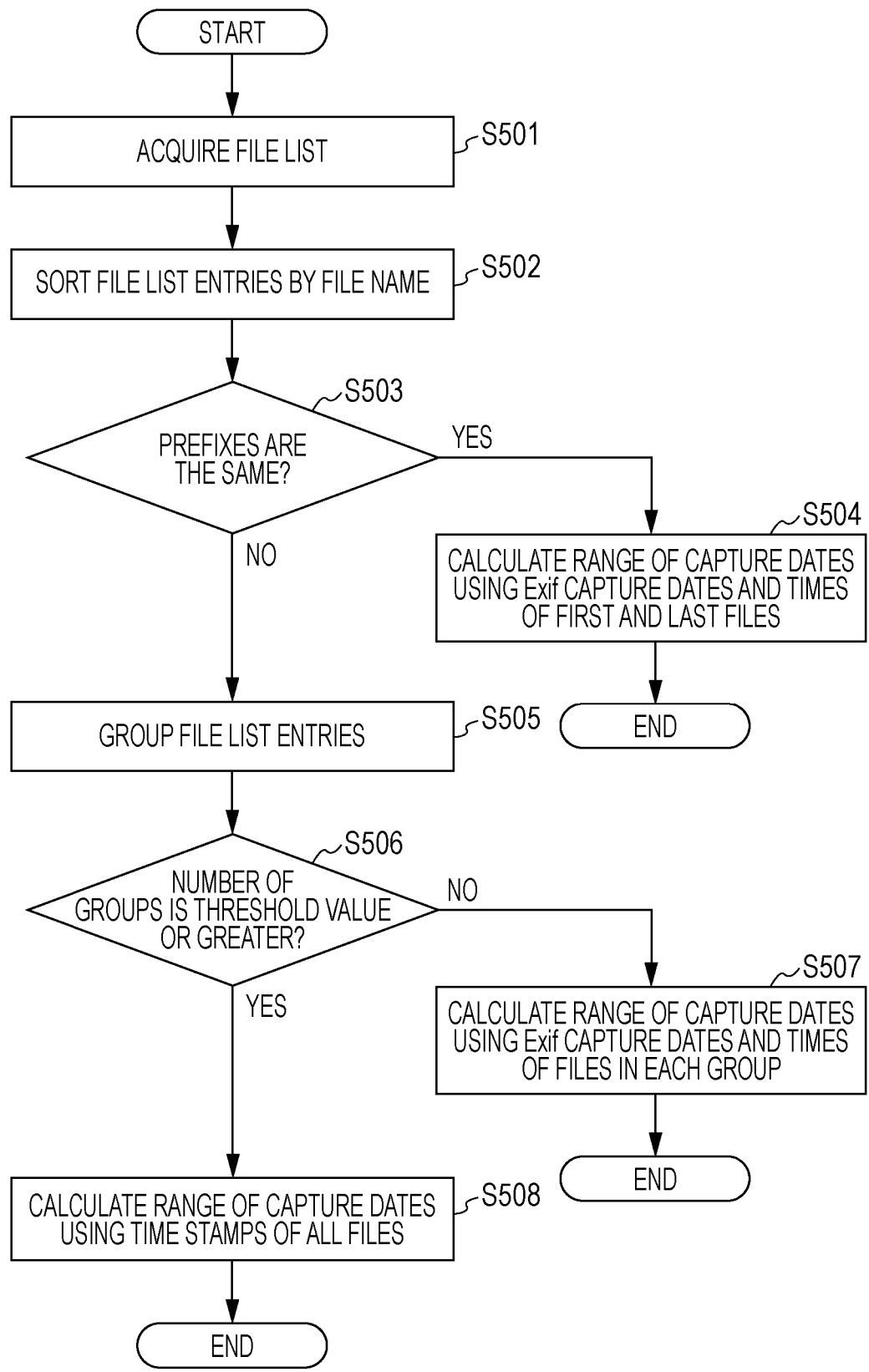
FIG. 5 is a flowchart of a process to identify the range of capture dates of the images contained in a folder according to a second exemplary embodiment.

Note that in the flow illustrated in FIG. 5, if the number of groups is greater than or equal to the threshold value (Yes in step S506), it may be determined that an error has occurred and the processing may be completed. In such a case, the processing may return to step S203 with an indication that the range of capture dates has not been acquired. At that time, an error message indicating that the range of capture dates for the folder cannot be acquired may be given to the user.

Third Exemplary Embodiment

According to the present exemplary embodiment, in the process to identify the range of capture dates of the image data contained in a folder, it is determined whether the Exif capture date and time is to be loaded or the time stamp is to be used first. Thereafter, the range of capture dates is identified. According to the present exemplary embodiment, if a large number of image data files having file names that do not follow CIPA naming convention are contained in a folder, the range of capture dates can be identified at high speed. For example, even when the software that changes the file name to a proprietary file name while retrieving a picture file from a digital camera is used or even when the user change the file names to its own file names to organize the pictures, the range of capture dates for the folder can be accurately identified.

In the following description of the present exemplary embodiment, description that is the same as in the first exemplary embodiment is not repeated.

Figure 7:
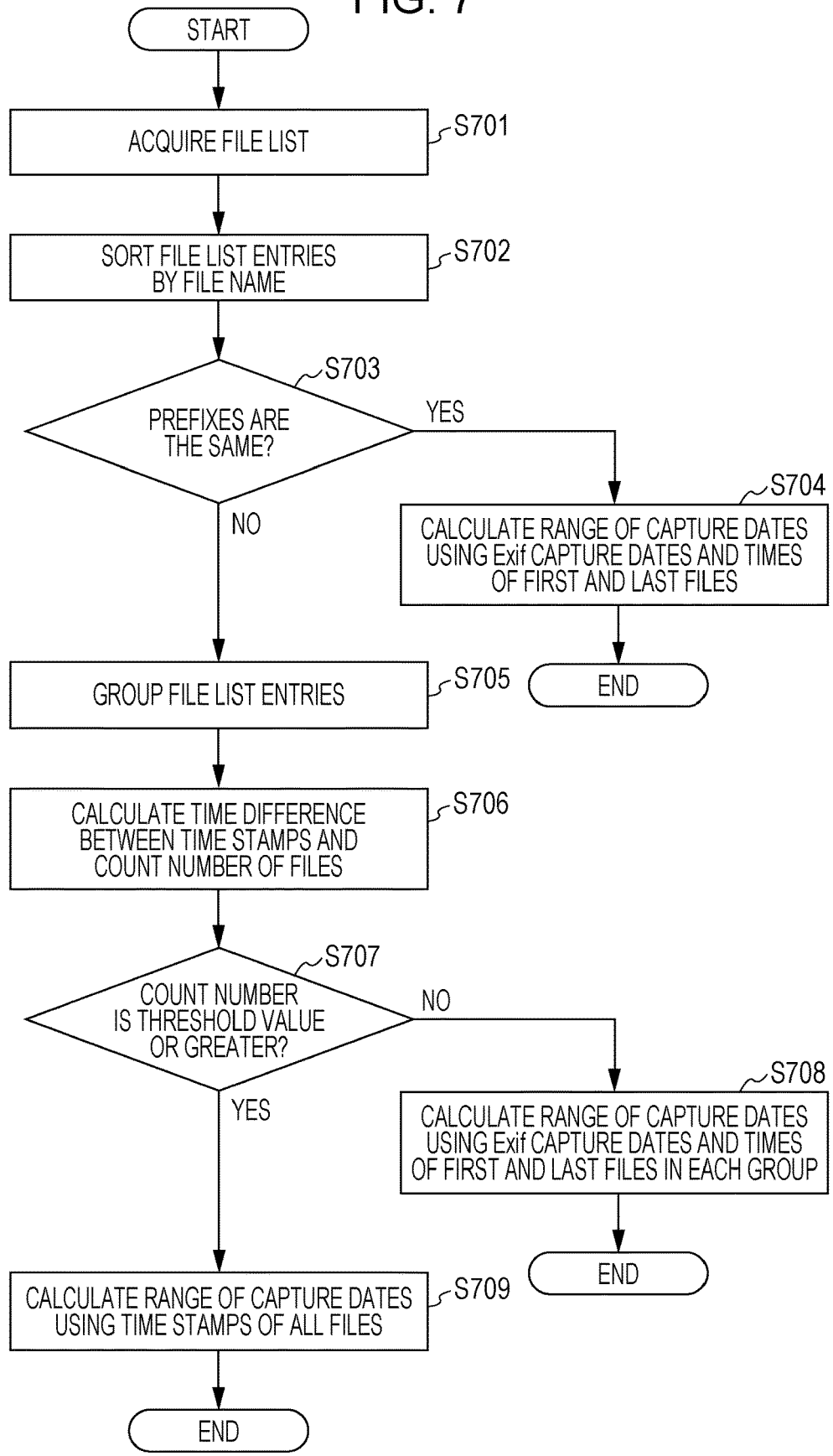
FIG. 7 is a flowchart of a process to identify the range of capture dates of the images contained in a folder according to a third exemplary embodiment.

The process to identify the range of capture dates of the images contained in a folder according to the present exemplary embodiment is described below with reference to a flowchart illustrated in FIG. 7.

Note that the processes in steps S701 to S705 are the same as those in steps S501 to S505 of the second exemplary embodiment, respectively. Accordingly, descriptions of steps S701 to S705 are not repeated.

In step S706, the time difference between the creation date and time and the modification date and time in the time stamps is calculated for the first file and the last file in each of the groups in the list. Subsequently, the number of image data files that require acquisition of the Exif capture date and time is counted on the basis of the time difference. If the time difference between the creation date and time and the modification date and time in the time stamps is greater than or equal to a preset time threshold value (e.g., 5 seconds), the file has been subjected to a copying or editing operation. Accordingly, the file is counted as an image data file that requires acquisition of the Exif capture date and time.

If the file has not been subjected to a copying operation and an editing operation, the time at which the file was newly created when the picture was taken serves as the creation date and time in the time stamp. In addition, the time at which writing of the data into the file was completed serves as the modification date and time. In general, the time required until completion of file writing is no longer than several seconds. Accordingly, if the difference between the creation date and time and the modification date and time is less than or equal to the time threshold value, it can be determined that the file has not been subjected to a copying operation and an editing operation. If an image data file has not been subjected to a copying operation and an editing operation, each of the creation date and time and the modification date and time in the time stamp is substantially the same as the Exif capture date and time. Accordingly, the accurate capture date and time information can be acquired from even the time stamp. Note that the time threshold value can be appropriately set on the basis of the estimated period of time required until completion of file writing.

In addition, if the image data file is copied, a file is newly created in the destination of the copy operation. Thus, the date and time at which the file is created serves as the creation date and time. In addition, since the content of the file itself is not modified, the modification date and time is the same as the date and time of capture of the image. Accordingly, the difference between the modification date and time in the time stamp and the creation date and time (the date and time the file was copied) is greater than the time required until completion of file writing. In such a case, it is highly likely that the accurate date and time of capture of the image cannot be acquired from the time stamp. Thus, it is desirable that the information in the time stamp not be used.

In addition, if an image data file is edited after the image data file is moved, the time stamp of the file at the movement source is the same as the time stamp of the file at the movement destination, since the file is not newly created. Thereafter, if the image data file is edited, the creation date and time in the time stamp of the image data file is the same as the date and time of capture of the image. In contrast, the modification date and time in the time stamp is modified to the date and time the image data file is edited. Accordingly, the difference between the creation date and time (the date and time of capture of the image) and the modification date and time in the time stamp is greater than the time required until completion of file writing. In such a case, it is highly likely that the accurate date and time of capture of the image cannot be acquired from the time stamp.

Still furthermore, when the image data file is copied and edited, the creation date and time of the image data file in the time stamp is set to the date and time at which the image data file was copied, and the modification date and time in the time stamp is the same as the date and time at which the image data file was edited. Even if the editing operation is performed immediately after the copying operation, the difference is greater than the time required until completion of file writing. Even in such a case, it is highly likely that the accurate date and time of capture of the image cannot be acquired from the time stamp.

However, it is difficult to distinguish whether a file is copied, the file is moved and, thereafter, is edited, or the file is copied and, thereafter, is edited. In particular, if the creation date and time in the time stamp is substantially the same as the modification date and time, any one of the above operations is not performed unless the time stamp is not intentionally edited. Accordingly, it is highly likely that the creation date and time and the modification date and time in the time stamp is the same as the Exif capture information. Thus, in step S706, the time difference between the creation date and time and the modification date and time in the time stamp is calculated for the first and last files in each of the groups in the list.

In step S707, it is determined whether the number of files counted in step S706 is less than the threshold value. If the number of files counted in step S706 is less than the threshold value (No in step S706), the processing proceeds to step S708. However, if the number of files counted in step S706 is greater than or equal to the threshold value (Yes in step S706), the processing proceeds to step S709. The threshold value can be appropriately determined. For example, the threshold value is set to 10.

In step S708, the application acquires the date and time of capture of the images from the image files corresponding to the first and last file names in the file name list.

If, in step S709, the Exif capture date and time is acquired in the information processing, a long time is required. Accordingly, the date and time information is acquired from existing time stamp. The creation date and time and the modification date and time can be acquired from the time stamp. In this case, the earlier one of the two dates and times is selected as the date and time of capture of the image. Thereafter, the earliest date and time and the latest date and time are searched for in the obtained dates and times of the capture of the images, and the range of capture dates of the images is calculated.

Through the above-described flow, the range of capture dates of the images in the folder can be calculated at high speed even when the folder contains a large number of files having file names that do not follow CIPA naming convention.

Fourth Exemplary Embodiment

A method for calculating the range of capture dates for a folder containing the files of images captured by a plurality of digital cameras according to the present exemplary embodiment is described next.

When digital cameras of different models of the same manufacturer are used, it may be difficult to group the image data file by prefix, like the second and third exemplary embodiments. For example, in some cases, cameras of a new version use the index starting at 0, and cameras of older version use the index starting from 1000. If these files are stored in the same folder, the date of capture of the last image file in the sorted list may be earlier than the date of capture of the first image file in the sorted list. According to the present exemplary embodiment, the range of capture dates can be accurately acquired at high speed even in such a case.

According to the present exemplary embodiment, the method for grouping the file list entries in step S505 differs from those of the second and third exemplary embodiments. The flowchart of the overall process is the same as that illustrated in FIG. 5 according to the second exemplary embodiment. Accordingly, description is not repeated. If the prefixes of the file names recorded by different image capturing devices are the same, the files cannot be grouped using the technique of the flowchart illustrated in FIG. 6. In contrast, according to the present exemplary embodiment, it is determined whether the acquired Exif capture date and time is correct by determining whether the date the first image file was captured is later than the date the last image file was captured.

Figure 8:
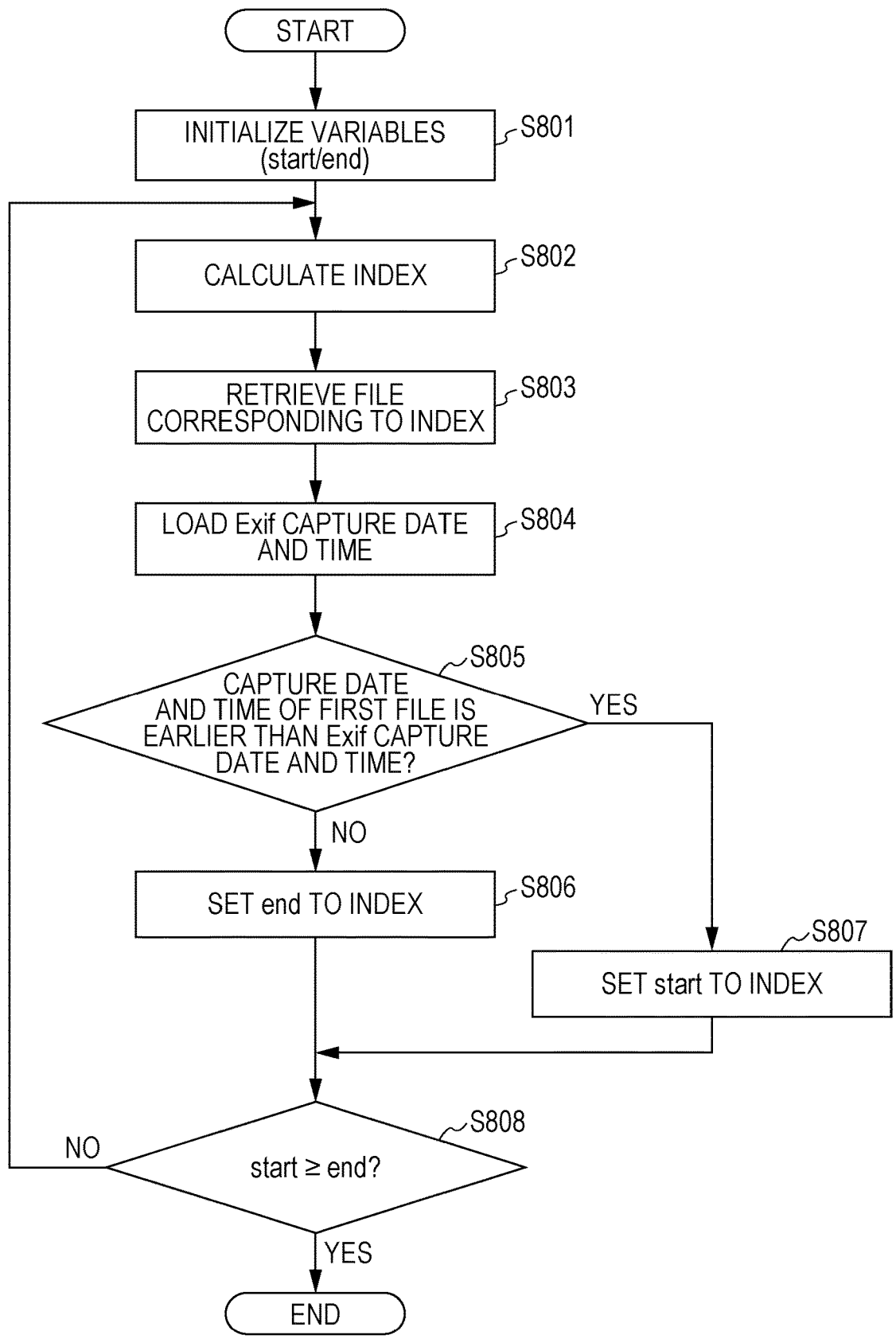
FIG. 8 is a flowchart of a process to group file list entries according to a fourth exemplary embodiment.

Description of the present exemplary embodiment that is the same as the description of the first exemplary embodiment is not repeated. A method for grouping the file list entries in step S505 according to the present exemplary embodiment is described below with reference to a flowchart illustrated in FIG. 8. According to the present exemplary embodiment, the binary search technique is employed. The date and time of the file that divides the file list into two halves is acquired. Thereafter, it is determined whether the file to be searched for is located in the first half or the second half. In this manner, the files are grouped.

In step S801, the application initializes two variables (start and end). To apply binary search, the variable "start" is initialized to 0, and the variable "end" is initialized to the number of files to be searched.

In step S802, the application obtains the index used for searching. The index indicates the position that divides the file list entries from the variable "start" to the variable "end" into halves. Thus, the index is calculated as (start+end)/2.

In step S803, the application obtains, from the file list, the file name located at the position indicated by the index.

In step S804, the application retrieves the file having the file name obtained in step S803. Thereafter, the application loads the Exif capture date and time from the file.

In step S805, the application compares the Exif capture date and time embedded in the first file with the Exif capture date and time obtained in step S804 and determines whether the Exif capture date and time embedded in the first file is earlier than the Exif capture date and time obtained in step S804. Note that the Exif capture date and time embedded in the first file is used for comparison each time this process is performed. Accordingly, the Exif capture date and time may be loaded and stored in the memory in advance, or the date and time of capture of the first file may be acquired when it is performed the process of the flowchart illustrated in FIG. 8 according to the second exemplary embodiment is correct, and the acquired value may be stored. If the date and time of capture of the first file is earlier than that obtained in step S804 (Yes in step S805), the processing proceeds to step S807. If the date and time of capture of the first file is earlier, it can be determined that the files up to the file position indicated by the index belong to a file set of the first half group. Subsequently, it needs to be determined which group the files after the position indicated by the current index belong to. Accordingly, the processing proceeds to step S807. However, if the date and time loaded in step S804 is earlier (No in step S805), it can be determined that the files from the position indicated by the index to the last file belong to a file set of the second half group. Subsequently, it needs to be determined which group the files prior to the file indicated by the index belong to. Thus, the processing proceeds to step S806.

In step S806, the variable end is set to the index value calculated in step S802. In the flowchart, the process is performed to find the position that allows grouping between the variable "start" and the variable "end". Accordingly, the process subsequent to this process is performed for the files between the variable start to the index value calculated in step 802. Thus, the operation on the files in the first half is continuously performed.

In step S807, the variable "start" is set to the index value calculated in step S802. Unlike the process performed in step S806 to find the positions of the files in the first half group, the process in this step is performed to find the positions of the files in the second half group.

In step S808, the variable "start" is compared with the variable "end", and it is determined whether the variable "start" is greater than or equal to the variable "end". If the variable start is less than the variable end (No in step S808), the files to be processed still remain. Thus, the processing returns to step S802. If the variable "start" is the same as the variable "end" (Yes in step S808), no files to be processed remain. Thus, the processing is completed.

According to the present exemplary embodiment, even when a file list that contains files having the same prefix is scanned, grouping by date and time of capture can be made. The above-described processing flow allows files to be divided into two groups. If a plurality of files having different dates and times of capture are in the same folder, the files can be divided into three or more groups by repeating the processes of the above-described flow.

According to the present exemplary embodiment, the dates and times of capture of the images in a folder can be identified at a speed higher than that when the Exif capture dates and times of all the images in the folder are acquired. In addition, according to the present exemplary embodiment, even when the pieces of information captured by a plurality of digital cameras are stored in a single folder, the range of capture dates of the images contained in the folder can be accurately identified at high speed.

Furthermore, according to the present exemplary embodiment, the Exif picture information regarding each of the image files having first file name and the last file name in a file list sorted for each group are acquired. Thus, even when the folder specified by the user contains a number of pictures that exceeds the allowable number for analysis, the range of capture dates of the pictures contained in the folder can be identified.

According to the above-described exemplary embodiments, the dates and times of capture of the images in a folder can be accurately identified at high speed.

Other Exemplary Embodiments

While the present invention had been described with reference to the above exemplary embodiments, the present invention is not limited thereto. For example, while the above-described exemplary embodiments have been described with reference to sorting of the image files by file name, the sorting is not limited thereto. The image files may be sorted by another piece of the file management information managed by the OS. For example, the image files may be sorted by the creation date and time or the modification date and time in the time stamp of the image file. Alternatively, for example, the image files may be sorted by file ID of the image file. When the file ID is used for the sort, the sort can be made in alphabetical order and in numerical order as in the above-described manner.

While the above-described exemplary embodiments have been described with reference to the Exif capture date and time, other meta information may be employed. An example of other meta information is Adobe Extensible Metadata Platform (XMP) date and time.

The above-described exemplary embodiments can also be achieved through the following processes. That is, the software (programs) that realizes the above-described functions of the above-described exemplary embodiments is supplied to a system or an apparatus via a network or a variety of types of storage medium, and a computer (a central processing unit (CPU) or a micro-processing unit (MPU)) of the system or apparatus loads and executes the program. At that time, the programs may be executed by a single computer or a plurality of computers that operate in coordination with one another. Note that all of the above-described processes need not be performed by software. Some or all of the processes may be performed by hardware, such as an application specific integrated circuit (ASIC). In addition, in terms of a CPU, all the processes need not be performed by a single CPU. A plurality of CPUs may perform the processes in cooperation with one another as needed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-157650 filed Aug. 7, 2015, which is hereby incorporated by reference herein in its entirety.

What is claimed is:

1. An information processing apparatus comprising:
at least one processor causing the information processing apparatus to;
acquire a plurality of file names that have been stored, wherein the plurality of file names respectively corresponds to a plurality of image files contained in a folder;
sort the acquired file names in a predetermined order;
determine, from the sorted file names, whether a prefix of a first file name at a top of the sorted file names and a prefix of a second file name at a bottom of the sorted file names are the same prefix;
acquire, a capture date of a first image of the determined first file name and a capture date of a second image of the determined second file name;
determine whether the number of the image files contained in the folder is greater than a threshold value,
identify a range of capture dates of images contained in the folder; and cause a display screen to display the identified range of capture dates,
wherein, in a case where it is determined that the prefix of the first file name and the prefix of the second file name are the same prefix, capture dates of images other than the determined first file name and determined second file name are not acquired and only the capture date of the first image and the capture date of the second image among all images are aquired and the range of the capture dates of the images contained in the folder is identified based on the acquired capture date of the first image and the acquired capture date of the second image,
wherein, in a case where it is determined that the prefix of the first file name and the prefix of the second file name are not the same prefix and it is determined that the number of the image files contained in the folder is not greater than the threshold value, capture dates of the all images are acquired and the range of the capture dates of the images contained in the folder is identified based on the all of the capture dates, and wherein, in a case where it is determined that the prefix of the first file name and the prefix of the second file name are not the same prefix and it is determined that the number of the image files contained in the folder is greater than the threshold value, the range of capture dates of the image files contained in the folder is identified based on time stamps of the image files contained in the folder.

2. The information processing apparatus according to claim 1,
wherein if it is determined that the prefix of the first file name and the prefix of the second file name are not the same, the at least one processor causes the information processing apparatus to acquire the all image files, and identify the range of capture dates of the image files contained in the folder based on the acquired all of the capture dates.

3. The information processing apparatus according to claim 1, wherein the at least one processor further causing the information processing apparatus to:
group file names in a case where it is determined that the prefix of the first file name and the prefix of the second file name are not the same,
in a case where it is determined that the prefix of the first file name and the prefix of the second file name are not the same, acquire, for each of groups, the capture date from the determined first file name that corresponds to the determined first file name that is the first one of the sorted file names and acquire, for each of groups, the capture date from the determined second file name that corresponds to the determined second file name that is the last one of the sorted file names, and
identify the range of capture dates of the image files contained in the folder based on the capture date of the first image and the capture date of the second image.

4. The information processing apparatus according to claim 1, wherein the file name is a file ID.

5. The information processing apparatus according to claim 1, wherein capture date is an EXIF capture date and time.

6. The information processing apparatus according to claim 1,
wherein the capture date is Adobe Extensible Metadata Platform (XMP) capture date and time.

7. The information processing apparatus according to claim 1,
wherein the at least one processor causes the information processing apparatus to display information according to the range of capture dates and a folder name as the information indicating the folder.

8. An information processing method comprising:
acquiring a plurality of file names that have been stored, the plurality of file names correspond to a plurality of image files contained in a folder;
sorting the acquired file names in a predetermined order;
determining, from the sorted file names, whether a prefix of a first file name at a top of the sorted file names and a prefix of a second file name at a bottom one of the sorted file names is the same prefix;
acquiring, a capture date of a first image of the determined first file name and a capture date of a second image of the determined second file name;
determining whether the number of image files contained in the folder is greater than a threshold value;
identifying a range of capture dates of images contained in the folder; and
displaying, on a display screen the identified range of capture dates, wherein, in a case where it is determined that the prefix of the first file name and the prefix of the second file name are the same prefix, capture dates of images other than the determined first file name and determined second file name are not acquired and only the capture date of the first image and the capture date of the second image among all images are aquired and the range of the capture dates of the images contained in the folder is identified based on the acquired capture date of the first image and the acquired capture date of the second image,
wherein, in a case where it is determined that the prefix of the first file name and the prefix of the second file name are not the same prefix and it is determined that the number of the image files contained in the folder is not greater than the threshold value, capture dates of the all images are acquired and the range of the capture dates of the images contained in the folder is identified based on the all of the capture dates, and
wherein, in a case where it is determined that the prefix of the first file name and the prefix of the second file name are not the same prefix and it is determined that the number of the image files contained in the folder is greater than the threshold value, the range of capture dates of the image files contained in the folder is identified based on time stamps of the image files contained in the folder.

9. The method according to claim 8, wherein
if it determined that the prefix of the first file name and the prefix of the second file name are not the same, the all image files, and identify the range of capture dates of the image files contained in the folder based on the acquired all of the capture dates.

10. The method according to claim 8, further comprising:
grouping file names in a case where it is determined that the prefix of the first file name and the prefix of the second file name are not the same,
wherein in a case where that it is determined that the prefix of the first file name and the prefix of the second file name are not the same, acquiring, for each of groups, the capture date from the determined first file name that corresponds to the determined first file name that is the first one of the sorted file names and acquiring, for each of groups, the capture date from the determined second file name that corresponds to the determined second file name that is the last one of the sorted file names, and
identifying the range of capture dates of the image files contained in the folder based on the capture date of the first image and the capture date of the second image.

11. The method according to claim 8,
wherein the file name is a file ID.

12. The method according to claim 8,
wherein capture date is an EXIF capture date and time.

13. The method according to claim 8,
wherein the capture date is Adobe Extensible Metadata Platform (XMP) capture date and time.

14. The method according to claim 8, further comprising:
displaying information according to the range of capture dates and a folder name as the information indicating the folder.

15. The method according to claim 8, further comprising
generating a layout image using at least a part of the image files contained in the folder, in a case where the folder indicated by the displayed information is selected by a user.

16. The information processing apparatus according to claim 1, wherein the at least one processor further causes the information processing apparatus to;

in a case where the folder indicated by the displayed information is selected by a user, generate a layout image using at least a part of the image files contained in the folder.

\* \* \* \* \*